United States Patent
Liu et al.

(10) Patent No.: US 11,922,205 B2
(45) Date of Patent: Mar. 5, 2024

(54) VIRTUAL MACHINE MANAGEMENT METHOD AND APPARATUS, DEVICE, AND READABLE STORAGE MEDIUM

(71) Applicant: INSPUR SUZHOU INTELLIGENT TECHNOLOGY CO., LTD., Jiangsu (CN)

(72) Inventors: Kai Liu, Jiangsu (CN); Zheng Xu, Jiangsu (CN); Yi Fan, Jiangsu (CN); Lihua Yan, Jiangsu (CN); Wen Huo, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/270,229

(22) PCT Filed: Nov. 30, 2021

(86) PCT No.: PCT/CN2021/134197
§ 371 (c)(1),
(2) Date: Jun. 29, 2023

(87) PCT Pub. No.: WO2023/015776
PCT Pub. Date: Feb. 16, 2023

(65) Prior Publication Data
US 2023/0393880 A1    Dec. 7, 2023

(30) Foreign Application Priority Data
Aug. 11, 2021 (CN) .......................... 202110916334.3

(51) Int. Cl.
*G06F 9/455* (2018.01)

(52) U.S. Cl.
CPC ............... *G06F 9/45558* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS 10,999,326 B1 * 5/2021 Pollitt .................... H04L 63/20
2010/0132011 A1 * 5/2010 Morris .................... G06F 21/53
718/1

(Continued)

FOREIGN PATENT DOCUMENTS

CN    108205623 A    6/2018
CN    108345491 A    7/2018

(Continued)

*Primary Examiner* — Lewis A Bullock, Jr.
*Assistant Examiner* — Melissa A Headly
(74) *Attorney, Agent, or Firm* — IPro, PLLC

(57) ABSTRACT

A virtual machine management method and apparatus, a device, and a readable storage medium. The virtual machine management method is applied to a private cloud, and comprises: acquiring a SELinux label, the SELinux label comprising five elements: User, Role, Type, Sensitivity, and Category (S101); setting elements other than Category in the SELinux label as default values (S102); assigning different values to Category according to a preset Category variable combination so as to obtain multiple non-duplicate label groups (S103); and configuring each label group to a virtual machine in the private cloud, so that virtual machines configured with the same label group communicate with each other, and virtual machines configured with different label groups are isolated from each other (S104).

19 Claims, 5 Drawing Sheets

(56) References Cited

U.S. PATENT DOCUMENTS

| | | | | |
|---|---|---|---|---|
| 2013/0227561 A1* | 8/2013 | Walsh | .................... | G06F 9/455 |
| | | | | 718/1 |
| 2013/0227635 A1* | 8/2013 | Walsh | ................ | G06F 21/6218 |
| | | | | 726/1 |
| 2022/0121745 A1* | 4/2022 | Chiueh | ............... | G06F 21/6218 |

FOREIGN PATENT DOCUMENTS

| | | |
|---|---|---|
| CN | 109101322 A | 12/2018 |
| CN | 112463203 A | 3/2021 |
| CN | 113377499 A | 9/2021 |

\* cited by examiner

VIRTUAL MACHINE MANAGEMENT METHOD AND APPARATUS, DEVICE, AND READABLE STORAGE MEDIUM

CROSS-REFERENCE TO RELATED APPLICATION

The present disclosure claims priority to Chinese patent application No. 202110916334.3, titled "VIRTUAL MACHINE MANAGEMENT METHOD AND APPARATUS, DEVICE, AND READABLE STORAGE MEDIUM", filed on Aug. 11, 2021 before the CNIPA, China National Intellectual Property Administration, which is incorporated herein in its entirety by reference.

TECHNICAL FIELD

The present disclosure relates to the technical field of computers, in particular to a virtual machine management method and apparatus, a device and a readable storage medium.

BACKGROUND

With the rapid development of cloud computing technology, a breakthrough solution is provided for the traditional information construction. Computation-related deployment may be divided into: public cloud, private cloud, community cloud and hybrid cloud. The private cloud is constructed and used by one client separately, and has effective control over data, security and quality of service. A private cloud platform is usually responsible for managing hundreds of virtual machines. Therefore, effective isolation among virtual machines may not only make the system operate stably, but also is an important measure to ensure the security of the whole system, otherwise, when a virtual machine is attacked, the whole system is likely to face the risk of being attacked.

SUMMARY

In view of the above, it is an object of the present disclosure to provide a method, an apparatus, and a device for managing virtual machines and a readable storage medium for fine-grained management of virtual machines in a private cloud. The detailed solution thereof is as follows:

In a first aspect, the present disclosure provides a method for managing virtual machines, applied to a private cloud and including:

acquiring a security-enhanced linux (SElinux) label, the SElinux label includes five elements of User, Role, Type, Sensitivity and Category;

setting elements other than the Category in the SElinux label as default values;

obtaining a plurality of distinct label groups by assigning, according to a preset Category variable combination, different values to the Category; and configuring each of the label groups to virtual machines in a private cloud, so that the virtual machines configured with the same label group intercommunicate, and the virtual machines configured with different label groups are isolated from each other.

In some embodiments, a value range of a count of variables in the preset Category variable combination is [1, 1024]; an assignment range for each of the variables is [0, 1023], and the assignment for a latter variable is greater than the assignment for a former variable.

In some embodiments, the obtaining a plurality of distinct label groups by assigning, according to a preset Category variable combination, different values to the Category includes:

obtaining the plurality of distinct label groups by assigning, according to the preset Category variable combination, different values to the Category using an incremental strategy or a random strategy.

In some embodiments, the method further includes storing the plurality of distinct label groups.

In some embodiments, the configuring each of the label groups to virtual machines in a private cloud includes:

extracting identification information about a label configuration switch and an ID of a to-be-configured label group from a request for creating a virtual machine; and adding the to-be-configured label group to a basic parameter file used for creating a virtual machine, and creating the virtual machine based on the basic parameter file, in response to determining based on the identification information that the label configuration switch is enabled and determining based on the ID that the to-be-configured label group is available.

In some embodiments, the method further includes:

returning a notification message indicating a virtual machine creation failure or jumping to a label group creation interface in response to determining based on the ID that the to-be-configured label group is not available.

In some embodiments, the method further includes:

establishing a mapping relationship between the ID and a created virtual machine, and storing the mapping relationship to a mapping table.

In some embodiments, the method further includes:
unbinding a target virtual machine configured with a target label group after the target virtual machine is deleted.

In some embodiments, the method further includes:

querying, based on the ID, the mapping relationship as well as the label group and the virtual machine associated with the mapping relationship.

In some embodiments, the method further includes:

releasing and deleting the mapping relationship between a target virtual machine configured with a target label group and the target label group after deleting the target virtual machine.

In a second aspect, the present disclosure provides an apparatus for managing virtual machines, applied to a private cloud, including:

an acquisition module, configured to acquire a security-enhanced linux (SElinux) label, the SElinux label comprises five elements of User, Role, Type, Sensitivity and Category;

a setting module, configured to set elements other than the Category in the SElinux label as default values;

a creation module, configured to obtain a plurality of distinct label groups by assigning, according to a preset Category variable combination, different values to the Category; and a configuration module, configured to configure each of the label groups to a virtual machine in the private cloud, so that virtual machines configured with the same label group intercommunicate, and virtual machines configured with different label groups are isolated from each other.

In a third aspect, the present disclosure provides an electronic device, including:
a memory for storing a computer program; and
a processor for executing the computer program to implement the method for managing virtual machines described above.

In a fourth aspect, the present disclosure provides a readable storage medium for saving a computer program, wherein the computer program, when executed by a processor, implements the method for managing virtual machines described above.

As can seen from the above solutions, the present disclosure provides a method for managing virtual machines, applied to a private cloud, including: acquiring a security-enhanced linux (SElinux) label, wherein the SElinux label includes five elements of User, Role, Type, Sensitivity and Category; setting elements other than the Category in the SElinux label as default values; obtaining a plurality of distinct label groups by assigning, according to a preset Category variable combination, different values to the Category; and configuring each of the label groups to the virtual machine in a private cloud, so that the virtual machines configured with the same label group intercommunicate, and the virtual machines configured with different label groups are isolated from each other.

BRIEF DESCRIPTION OF THE DRAWINGS

In order to explain embodiments of the present disclosure or technical solutions in the related art more clearly, the following will briefly introduce drawings which need to be used in the description of the embodiments or the related art. Apparently, the drawings in the following description are merely embodiments of the present disclosure, other drawings may be obtained according to the provided drawings by those skilled in the art without involving any creative effort.

DETAILED DESCRIPTION

Figure 1:
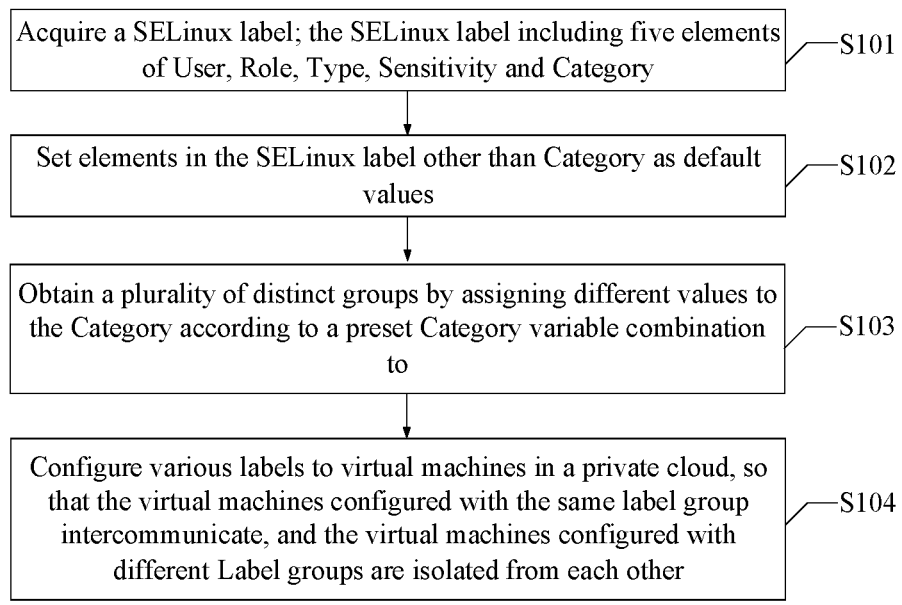
FIG. 1 is a flow chart of a method for managing virtual machines according to the present disclosure.

The technical solutions in the embodiments of the present application will be described clearly and completely below in conjunction with accompanying drawings in the embodiments of the present application. Apparently, the described embodiments are only a part of the embodiments of the present application, not all the embodiments. Based on the embodiments of the present application, all other embodiments obtained by those skilled in the art without creative work fall within the protection scope of the present application.

At present, physical isolation is typically used for various virtual machines in a private cloud, i.e., virtual machines deployed on the same physical machine intercommunicate, while virtual machines deployed on different physical machines are isolated from each other. However, such isolation is not elaborated enough, and precise isolation of resources cannot be performed for different virtual machines on the same physical machine.

For example, in the solution disclosed in CN 104580505A, VLAN tag is used to achieve tenant isolation. However, in VLAN, virtual machines are isolated at a network layer on the basis of the physical machines, and different virtual machines in the same VLAN cannot be isolated from each other, and thus the isolation granularity of the VLAN is large and cannot control the isolation or interworking among individual virtual machines. Since VLAN isolation is only performed on the network surface, the security level is low. Once a virtual machine in a VLAN is hacked, other virtual machines on the same physical server as the virtual machine may also be hacked. It may be seen that the VLAN isolation means used in CN 104580505A is directed to a network level and a physical machine, the granularity of isolation or connection is larger, and the security level needs to be improved.

In the solution disclosed in CN 109101322A, a label Selinux security mechanism is used to provide paired labels to a virtual machine process and an image, so that non-paired process and image cannot start, and at the same time, a process holding the non-paired label does not access a file and a device of the image label, thereby achieving security isolation. However, as can be seen from the solution, in which a unique label "system_u:system_r:svirt_t:s1" is assigned to the process when virtual machine 1 starts, and a unique label "system_u:system_r:svirt_t:s2" is allocated to the process when virtual machine 2 starts, the tails of the labels configured for virtual machines 1 and 2 in the solution are s1 and s2, corresponding to Sensitivity elements. It may be seen that the virtual machines are isolated based on "Sensitivity" in Selinux in this solution. The sensitivity-based isolation is not a complete isolation because sensitivities are used to control the sensitivity size of the label and there is an inclusion relationship, i.e., higher sensitivities have access and control rights to lower sensitivities. For example, the superiors in a company have management rights for ordinary employees.

Therefore, how to perform fine-grained management on virtual machines in a private cloud is a problem to be solved by those skilled in the art.

At present, physical isolation is typically used for various virtual machines in a private cloud, i.e., virtual machines deployed on the same physical machine intercommunicate, while virtual machines deployed on different physical machines are isolated from each other. However, such isolation is not elaborated enough, and precise isolation of resources cannot be performed for different virtual machines on the same physical machine. To this end, the present disclosure provides a virtual machine management solution capable of performing fine-grained management on virtual machines in a private cloud.

With reference to FIG. 1, an embodiment of the present disclosure provides a method for managing virtual machines, which is applied to a private cloud, including:

At S101, a Security-Enhanced Linux (SELinux) label is acquired, and the SELinux label includes five elements of User, Role, Type, Sensitivity and Category.

Among them, SELinux is a security subsystem of Mandatory Access Control (MAC) developed under an open source community of Linux. The object of SELinux is to constrain each service process so that only resources that should be acquired are acquired. In particular, labels for processes and files are set, and each of the labels is composed of 5 security elements, that is, User, Role, Type, Sensitivity and Category.

At S102, elements in the SELinux label other than Category are set as default values.

At S103, a plurality of distinct label groups are obtained by assigning different values to the Category according to a preset Category variable combination.

In some embodiments, the value range of the number of variables in the preset Category variable combination is [1, 1024]; the assignment range for each variable is [0, 1023], and the assignment for the latter variable is greater than the assignment for the former variable.

If the number of variables in the Category variable combination is two, then the Category variable combination is: $C_1$, $C_2$. The value range of single variable in the Category variable combination is c0~c1023, i.e., $C_1$ may take a value from c0 to c1023, and $C_2$ may also take a value from c0 to c1023.

The greater the number of variables in the Category variable combination, the more label groups are available. When assigning values to each variable in the Category variable combination, it should be noted that in a certain Category variable combination, the assignment of the latter variable shall be greater than the assignment of the former variable. Taking the Category variable combination ($C_1$, $C_2$) as an example, when $C_1$=c0, $C_2$ may take the value of c1~c1023, then Category may take the value of: c0, c1; c0, c2; c0, c3; c0, c4; . . . , c0, c1023; when $C_1$=c1, $C_2$ may take the value of c2~c1023, then Category may take the value of: c1, c2; c1, c3; c1, c4; c1, c5; . . . , c1, c1023. By analogy, 523776 distinct label groups may be created.

Generally, in a private cloud, the number of variables in the Category variable combination is a fixed value. The number of variables in the Category variable combinations in different private clouds may be different.

In an embodiment, a plurality of distinct label groups are obtained by assigning different values to the Category according to a preset Category variable combination as follows: an incremental strategy or a random strategy is used to assign different values to the Category according to the preset Category variable combination to obtain a plurality of distinct label groups. Among them, the incremental strategy is superior to the random strategy, because the currently obtained label group cannot be repeated with the already existing label groups, it is necessary to check whether a label group already exists every time the label group is created. The re-checking process of label groups may be omitted by using the incremental strategy, and the time for determining repetition is also omitted, so the efficiency may be improved.

In this embodiment, after the plurality of distinct label groups are obtained, the label groups are stored so that they are configured to the virtual machines later.

At S104, the label groups are configured to virtual machines in the private cloud, so that the virtual machines configured with the same label group intercommunicate, and the virtual machines configured with different label groups are isolated from each other.

In some embodiments, the label groups are configured to virtual machines in the private cloud by: extracting identification information about a label configuration switch and an ID of a to-be-configured label group from a request for creating a virtual machine; adding the to-be-configured label group to a basic parameter file used for creating a virtual machine, and creating a virtual machine based on the basic parameter file if it is determined based on the identification information that the label configuration switch is enabled, and it is determined based on the ID that the to-be-configured label group is available.

If it is determined based on the ID that the to-be-configured label group is not available, a notification message indicating a virtual machine creation failure is returned or it is jumped to a label group creation interface. If it is determined based on the identification information that the label configuration switch is disabled, a virtual machine is directly created based on the basic parameter file, that is to say, the to-be-configured label group is not included in the basic parameter file.

It should be noted that a virtual machine and a label group configured for the same are in a mapping relationship. Therefore, in some embodiments, if a target virtual machine configured with a target label group is deleted, the target virtual machine is unbounded from the target label group, that is to say, the mapping relationship between the two is released.

As may be seen, in the present embodiment, the SELinux label is used to manage various virtual machines in a private cloud. In some embodiments, elements in the SELinux label other than the Category are set as default values, and different values are assigned to the Category in the SELinux label according to a preset Category variable combination, so that a plurality of distinct label groups are obtained; then, the label groups are configured for virtual machines in a private cloud, so that virtual machines configured with the same label group intercommunicate, and virtual machines configured with different label groups are isolated from each other. As may be seen, in the present embodiment, virtual machines are configured with the same or different label groups, thereby achieving isolation or intercommunication of different virtual machines. In the solution, it is not necessary to focus on whether the virtual machines needing to be isolated are deployed on the same physical machine or on different physical machines, and it only needs to configure different label groups for the virtual machines needing to be isolated, thereby achieving accurate isolation between the virtual machines, i.e., fine-grained management of virtual machines in the private cloud is achieved.

Based on the above embodiments, it should be noted that the distinct label groups created may be recorded in a label group data table, and created virtual machine instances of the respective virtual machines may be recorded in a virtual machine instance table. If a certain virtual machine is configured with a certain label group while being created, a mapping relationship between the ID of the label group and the virtual machine is established, and the mapping relationship is stored into a mapping table. That is, after a to-be-configured label group is added to the basic parameter file used for creating a virtual machine, and the virtual machine is created based on the basic parameter file, a mapping relationship between the ID of the to-be-configured label group and the created virtual machine is established, and the mapping relationship is stored in the mapping table.

Of course, a corresponding mapping relationship may be queried in the mapping table based on the ID of a label group, a corresponding label group may also be queried in the label group data table based on the ID of the label group, and a corresponding virtual machine may also be queried in the virtual machine instance table based on the ID of the label group (i.e., querying a virtual machine having an association with the ID). That is, the mapping relationship as well as the label group and the virtual machine associated with the mapping relationship are queried based on the ID.

Accordingly, after the target virtual machine configured with the target label group is deleted, the mapping relationship between the target virtual machine and the target label group is released, and the mapping relationship is deleted from the mapping table.

An apparatus for managing virtual machines provided by an embodiment of the present disclosure is described below, and the apparatus for managing virtual machines described below and the method for managing virtual machines described above may be referred to each other.

Figure 2:
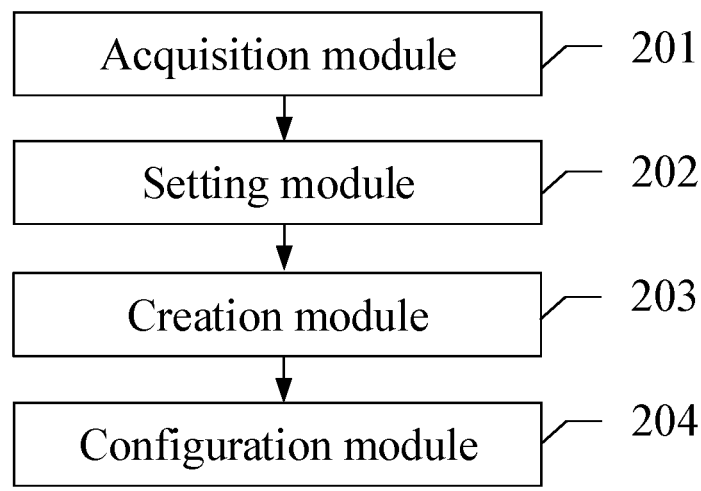
FIG. 2 is a schematic diagram illustrating an apparatus for managing virtual machines according to the present disclosure.

With reference to FIG. 2, an embodiment of the present disclosure provides an apparatus for managing virtual machines, applied to a private cloud, including:

an acquisition module 201, configured to acquire a SELinux label; the SELinux label includes five elements of User, Role, Type, Sensitivity and Category;

a setting module 202, configured to set elements in the SELinux label other than the Category as default values;

a creation module 203, configured to assign different values to the Category according to a preset Category variable combination to obtain a plurality of distinct label groups; and a configuration module 204, configured to configure label groups for virtual machines in a private cloud, so that the virtual machines configured with the same label group intercommunicate, and the virtual machines configured with different label groups are isolated from each other.

In some embodiments, the value range of the number of variables in the preset Category variable combination is [1, 1024]; the assignment range for each variable is [0, 1023], and the assignment for the latter variable is greater than the assignment for the former variable.

In some embodiments, the creation module is further configured to:

assign, according to the preset Category variable combination, different values to the Category by using an incremental strategy or a random strategy to obtain the plurality of distinct label groups.

In some embodiments, the apparatus further includes:

a storage module configured to store the plurality of distinct label groups.

In some embodiments, the configuration module is further configured to:

extract identification information about a label configuration switch and an ID of a to-be-configured label group from a request for creating virtual machines;

in response to determining based on the identification information that the label configuration switch is enabled, and determining based on the ID that the to-be-configured label group is available, add the to-be-configured label group to a basic parameter file used for creating a virtual machine, and create the virtual machine based on the basic parameter file.

In some embodiments, the configuration module is further configured to:

return a notification message indicating a virtual machine creation failure or jump to a label group creation interface in response to determining based on the ID that the to-be-configured label group is not available.

In some embodiments, the apparatus further includes:

a mapping relationship establishment module, configured to establish a mapping relationship between the ID and the created virtual machine, and store the mapping relationship to a mapping table.

In some embodiments, the apparatus further includes:

a query module, configured to query, based on the ID, the mapping relationship as well as the label group and the virtual machine associated with the mapping relationship.

In some embodiments, the apparatus further includes:

an unbinding module, configured to release and delete the mapping relationship between a target virtual machine configured with a target label group and the target label group after the target virtual machine is deleted.

Here, with regard to the operation of each module and unit in the embodiment, reference may be made to the corresponding contents disclosed in the foregoing embodiments, and the description thereof will not be repeated.

It may be seen that the embodiment provides an apparatus for managing virtual machines, through which virtual machines are configured with the same or different label groups to realize the isolation or intercommunication of different virtual machines. In the solution, it is not necessary to focus on whether the virtual machines needing to be isolated are deployed on the same physical machine or on different physical machines, and it only needs to configure different label groups for the virtual machines needing to be isolated, thereby achieving accurate isolation between the virtual machines, i.e., fine-grained management of virtual machines in the private cloud is achieved.

An electronic device provided by an embodiment of the present disclosure is described below, and the electronic device described below and a method and an apparatus for managing virtual machines described above may be referred to each other.

Figure 3:
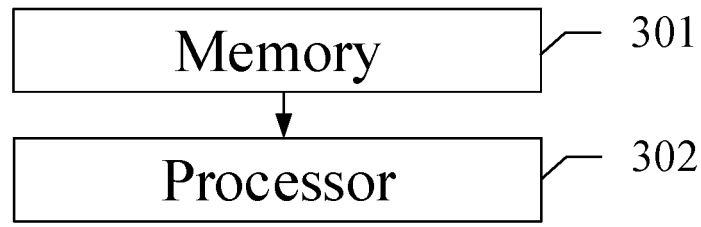
FIG. 3 is a schematic diagram illustrating an electronic device according to the present disclosure.

With reference to FIG. 3, the embodiment of the present disclosure provides an electronic device, including:

a memory 301 configured to store a computer program; and a processor 302 configured to execute the computer program to implement the method disclosed in any of the embodiments described above.

A readable storage medium provided by an embodiment of the present disclosure is described below, and the readable storage medium described below and the method, apparatus for managing virtual machines and device described above may be referred to with each other.

The readable storage medium is stored with a computer program that, when executed by a processor, implements the method for managing virtual machines disclosed in the foregoing embodiments. With regard to the detailed steps of the method, reference may be made to corresponding contents in the foregoing embodiments, which will not be described in detail herein.

A process of creating label groups and a process of configuring label groups for virtual machines mentioned above are described in detail in connection with the following embodiment. In this embodiment, the label group is also referred to as a SELinux label group.

1. The Process of Creating Label Groups

A process of generating, storing and allocating a label group is designed, the management of the label groups is realized by adding a label group functional module to a virtual calculation management component of a private cloud operating system and providing an interfaces for creating, deleting and searching the label group. Moreover, the flexible control of the label groups is realized by providing a function switch for enabling the label groups.

The private cloud operating system, which is also known as a cloud computing center operating system, a cloud OS, is a comprehensive management system of software and hardware resources based on basic hardware (server, storage, network, etc.) and basic software (stand-alone operating system, database, etc.). It is generally composed of a virtual calculation management component, a distributed file system, service/resource scheduling management, basic software and hardware management, etc. The private cloud operating system includes those implemented using KVM (Kernel-based Virtual Machine) technology, such as openstack.

The virtual calculation management component is one of the core components in the private cloud operating system, and is responsible for managing the life cycle of the virtual machine in the cloud platform. In the present embodiment, corresponding functions are achieved by adding an interface and a functional module code in the virtual calculation management component.

In some embodiments, main steps of adding a label group module in the virtual calculation management component are as follows.

In step 1, a label group data table is added in a database of the virtual calculation management component, and the label group data table is used for storing all the created label groups.

A mapping association relationship may established between each label group and a corresponding virtual machine instance so as to configure the label group for the corresponding virtual machine. Each virtual machine corresponds to one virtual machine instance. One label group may be configured for multiple virtual machines. The virtual machines configured with the same label group intercommunicate, and the virtual machines configured with different label groups are isolated from each other.

In step 1, two tables, that is, the label group data table (instance_seclabel_groups) and a mapping table of label groups and virtual machine instances (instance_seclabel_group_member), are added to the database of the virtual calculation management component. The mapping relationships between the label groups and the virtual machine instances in the mapping table may be flexibly specified by a user.

The label group data table may be found in Table 1.

TABLE 1

| Field name | Type | Note |
| --- | --- | --- |
| uuid | String(36) | Unique identification |
| id | Int(11) | Auto Increment |
| created_at | DateTime | Creation time |
| updated_at | DateTime | Update time |
| User_id | String(255) | uuid of User |
| project_id | String(255) | uuid of Tenant (project) |
| label_category | Strmg(64) | Selinux label of C level, CXXX, CXXX |
| name | Slring(255) | Name of Selinux label group |

The mapping table may be found in Table 2.

TABLE 2

| Field name | Type | Note |
| --- | --- | --- |
| id | Int(11) | Auto Increment |
| created_at | DateTiine | Creation time |
| updated_at | DateTime | Update time |
| Instance_uuid | String(36) | uuid of Instance |
| group_id | String(255) | id of Selinux label group |

In Table 2, the Instance_uuid (uuid of Instance) specifies a certain virtual machine instance, and the group_id specifies a certain label group.

In step 2, a set of interfaces for managing label groups, such as an interface for creating, an interface for searching, an interface for deleting, is added according to the interface style of the virtual calculation management component.

In step 2, the interfaces for managing label groups include: creating a label group (/os-seclabel-groups), the request mode of which is Post; searching a label group in pages (/os-seclabel-groups), the request mode of which is Get; searching a label group individually according to the ID (/os-seclabel-groups/{group_id}), the request mode of which is Get; and deleting a label group according to the ID (/os-seclabel-groups/{group_id}), the request mode of which is Delete. Among them, creating a label group means establishing a label group.

The interface information about interfaces for creating, searching and deleting is shown in Table 3, including: creating (/os-seclabel-groups), searching in pages (/os-seclabel-groups), searching individually according to the ID (/os-seclabel-groups/{group_id}), and deleting (/os-seclabel-groups/{group_id}).

TABLE 3

| Interface | Request mode | Interface instruction |
| --- | --- | --- |
| /os-seclabel-groups | Post | Creating |
| /os-seclabel-group | Get | Searching in pages |
| /os-seclabel-groups/{group_id} | Get | Searching individually based on the ID |
| /os-seclabel-groups/{group_id | Deleting | Deleting individually based on id |

The format of the request parameter of the interface for creating is:

```
{
  "seclabel_group": {
    "name": "secgroup01"
  }
}
```

As can be seen, a label group may be created only by creating a name of the SELinux label group.

After the label group is successfully created, the following value is returned by the interface:

```
{
  "seclabel_group": {
    "id": "5bbcc3c4-1da2-4437-a48a-66f15b1b13f9"
    "name": "secgroup01",
    "label_category": "c100, c101",
    "members": [ ],
    "project_id": "6f70656e737461636b20342065766572",
    "user_id": "8ef0656e737461636b20342065766572"
  }
}
```

Among them, the value of label_category is an assigned value of Category. The first four elements User, Role, Type and Sensitivity of a SELinux label keep defaults as system_u, system_r, svirt_tcg_t and s0 respectively, and Category is assigned with values c100 and c101, then a SELinux label group of system_u:system_r:svirt_tcg_t:s0:c100,c101 may be obtained.

In step 3, in the logic design for creating label groups, a random or incremental strategy may be selected to generate the label groups.

In some embodiments, the process of adding a label group includes: keeping User, Role, Type, Sensitivity in the SELinux label unchanged by defaults (system_u: system_r: svirt_tcg_t: s0), and only assigning values to Category. The detailed assignment of Category may be referred to the following description.

Figure 4:
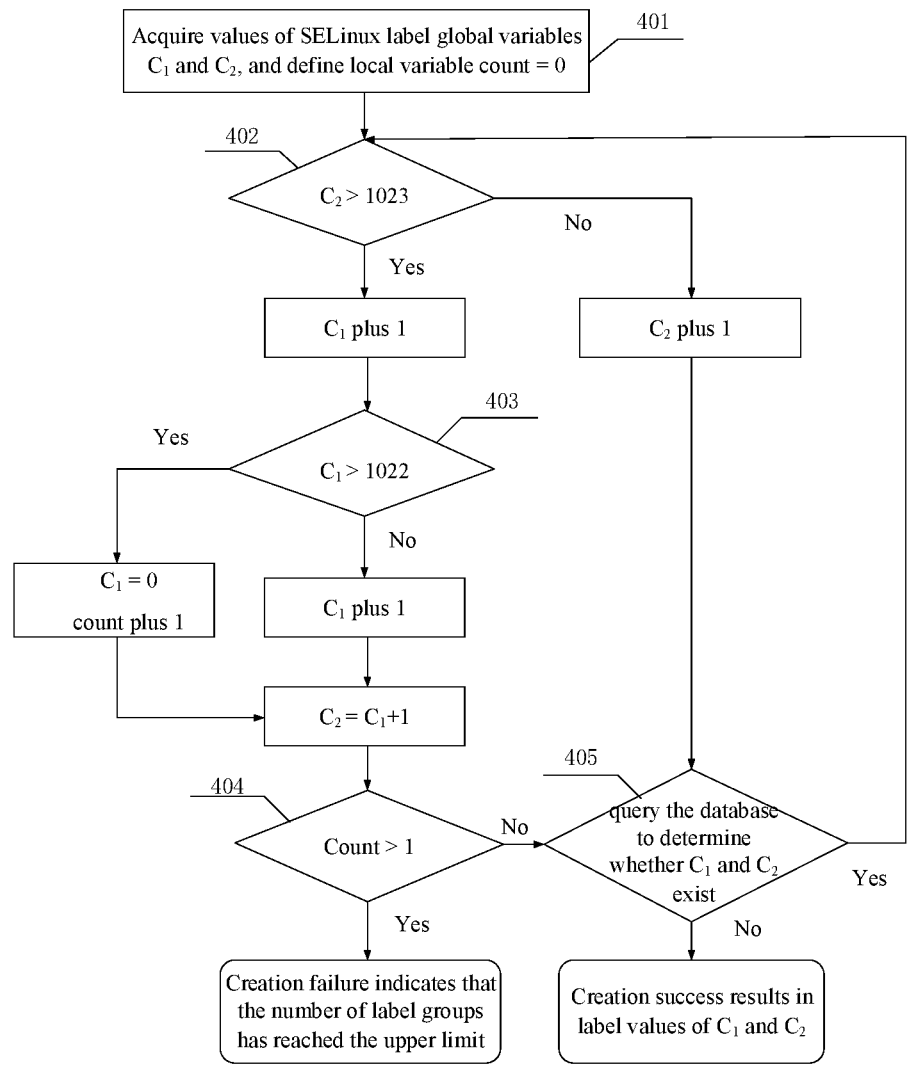
FIG. 4 is a flow chart for creating a label group according to the present disclosure.

Referring to FIG. 4, assuming that the Category variable combination is ($C_1$, $C_2$), the process of adding a SELinux label group includes steps below.

At step 401, global variables $C_1$ and $C_2$ of the SELinux label are acquired. The function of the global variables $C_1$ and $C_2$ is to record the maximum value state of the currently generated label groups, so that $C_1$ and $C_2$ may be directly incremented on the basis of the current values thereof when a label group is added, thereby avoiding the time-consuming invalid cycle of incrementing from 0 each time.

The initial value of $C_1$ is 0, the initial value of $C_2$ is 1, the value range of $C_1$ is c0~c1022, the value range of $C_2$ is c1~c1023, and $C_2$ is greater than $C_1$.

Moreover, a local variable 'count' is defined, and the initial value of count is 0. The count is used to record the number of cycles traversing the whole label group.

At step 402, it is determined whether the value of $C_2$ is greater than 1023; if so, it indicates that $C_2$ arrives at the maximum value thereof, then the value of $C_1$ is increased by 1; otherwise, it indicates that $C_2$ has not arrived at the maximum value thereof, only the value of $C_2$ needs to be increased by 1, and $C_1$ does not change.

At step 403, it is determined whether the value of $C_1$ is greater than 1022; if so, it indicates that $C_1$ arrives the maximum value thereof, then $C_1$ is assigned as 0 to traverse once again, so that a vacancy value caused by deleting a previously generated label group is acquired, and at the same time, 1 is added to the value of the count to indicate that the number of traversal times is increased once; otherwise, it indicates that $C_1$ has not arrived at the maximum value thereof, then the value of $C_1$ is increased by one. $C_2$ is then assigned as the value of $C_1$ plus 1.

At step 404, it is determined whether the value of count is greater than 1, if so, indicating that it has been traversed once from 0, and there is no available label value, and returning a creation failure at this moment, prompting the user that the number of the SELinux label groups has reached the maximum value, and being unable to create a new label group; otherwise, it indicates that all the created label group have not been traversed, then the precess proceeds to the next step.

At step 405, it is determined whether the re-assigned $C_1$ and $C_2$ exist in the label group data table, and if so, the process returns to step 402 to re-assign; otherwise, it indicates that this label group has not been occupied, then the new label group is successfully created, and is saved to the label group data table, and a message indicating that the label group is successfully created is returned to the user.

In step 4, the interfaces for creating, searching and deleting label groups are tested respectively to ensure that these interfaces may be normally called.

2. The Process of Configuring Label Groups for Virtual Machines

At step 1, a field for saving the SELinux label group of the virtual machine is added in a virtual machine instance table in the database of the virtual calculation management component.

In step 1, the virtual machine instance table is a data table for storing information about virtual machines, and on the basis of original fields in the data table, a new field is added for saving the SELinux label group of a virtual machine. The added field is string type, the name of the field may be arbitrarily selected, and the recommended name is seclabel.

At step 2, a request parameter that is used for specifying the ID of the SELinux label group and switch information about whether to turn on the SELinux label group is added in the interface for creating virtual machines.

In step 2, the added request parameter is named as seclabel, which is consistent with the field name added in step 1. The data type of the parameter is a json character string. The parameter includes two attributes: one of the attributes is named as state, and indicates whether to enable a SELinux, and the SELinux is enabled when the value is true, and is disabled when the value is false; another one of the attributes is named as group_id, indicates the ID of the SELinux label group, and has the value of the ID of a created SELinux label group.

Referring to codes below, the part in bold is the newly added seclabel, data type of the parameter is a json character string, and the parameter includes two attributes of state and group_id. The state indicates whether to enable the SELinux label group function, and the SELinux label group function is enabled when the value thereof is true, and is disabled when the value thereof is false; and group_id indicates the ID of the SELinux label group, and has the value of the ID of a created SELinux label group.

```
{
   "server" : {
      "name" : "new-server-test",
      "imageRef" : "70a599e0-31e7-49b7-b260-868f441e862b",
      ......
      "seclabel" : {
        "state" : "true",
        "group_id" : "5bbcc3c4-1da2-4437-a48a-66f15b1b13f9",
      }
      ......
   }
}
```

At step 3, the ID of the SELinux label group and switch information are obtained by a back end for creating interfaces of the virtual machine, and when the switch is enabled, the SELinux label group is queried according to the id, and the SELinux label group is configured into the basic parameter xml file of the virtual machine.

In step 3, the basic parameter file format is the xml format specified by virtual machine creation interface of libvirt.

At step 4, the libvirt interface is called to transfer the configured xml file to libvirt to create a virtual machine with a custom SELinux label group.

In step 4, libvirt is a virtualized API for operating and managing KVMs (Kernel-based Virtual Machine), which is written in C language, and may be called by languages such as Python, Ruby, Perl, PHP, Java, etc. The virtual calculation management component transfers the processed xml basic parameter file to the libvirt, so that the libvirt operates KVM to create a virtual machine.

Figure 5:
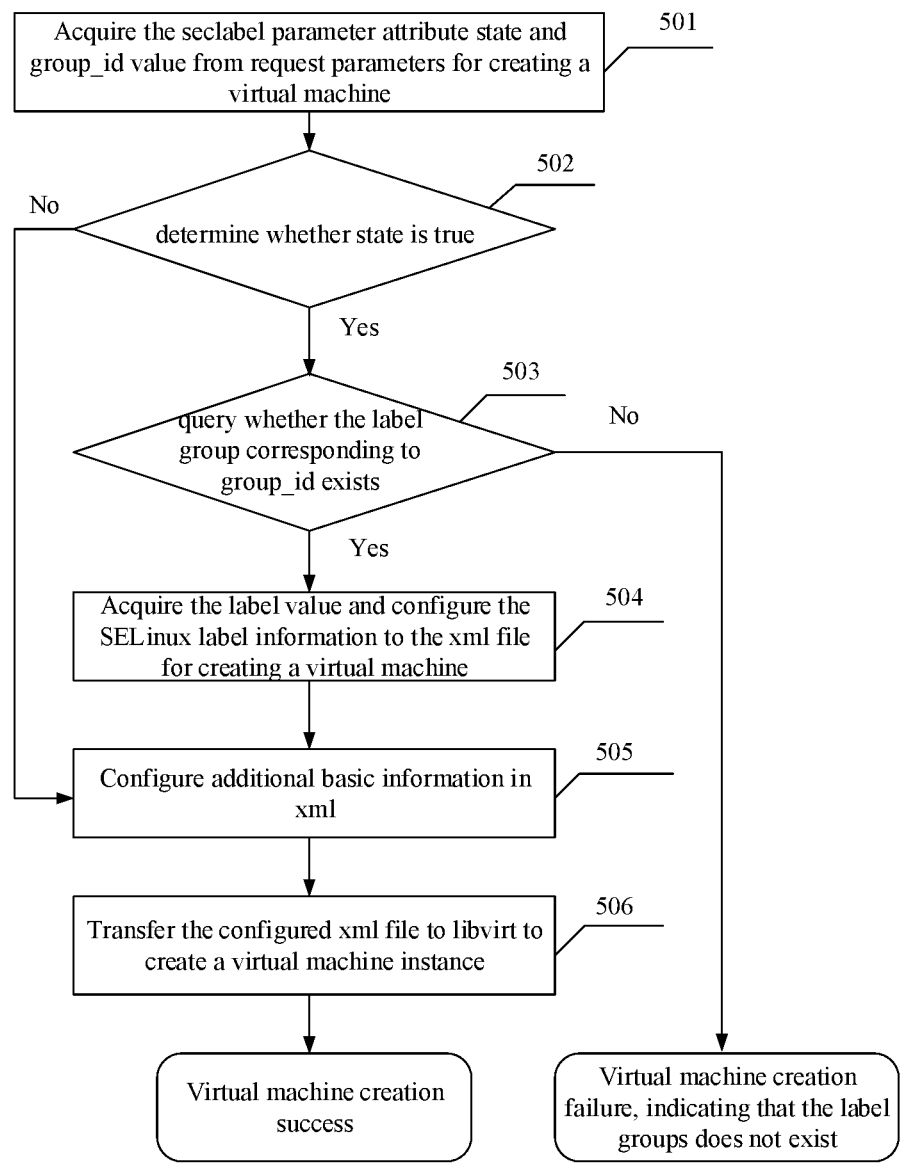
FIG. 5 is a flow chart for configuring virtual machines according to the present disclosure.

The configuration flow of label groups is shown in FIG. 5, including steps below.

At step 501, the seclabel parameter is acquired from the interface request parameter for creating virtual machines, and the values of attributes state and group_id are extracted from the seclabel.

At step 502, it is determined whether the value of state is "true", if yes, indicating that the function of thr SELinux label group is enabled, and a customized SELinux label needs to be set for a virtual machine; otherwise, it indicates that the function of the SELinux label group is disabled, and the customized SELinux label is not necessary to be set.

At step 503, the SELinux label group table in the database is queried according to the group_id to determine whether a corresponding label group exists, and if so, the value of the label is acquired; otherwise, a message indicating the creation failure of virtual machines is returned to prompt the user that the entered ID of the label group does not exist.

At step 504, the value of the label is acquired, and the xml format specified in SELinux label is configured according to libvirt. A sample being configured is as follows:

```
<seclabel type=='static' model=='selinux' relabel=='yes'>
<label>system_u:system_r:svirt_tcg_t:s0:C100,C101</label>
</seclabel>
```

At step 505, other parameter information of the virtual machine, such as network, mirror image, is configured.

At step 506, the configured xml is transferred, via a libvirt interface, to the libvirt to create a virtual machine.

Figure 6:
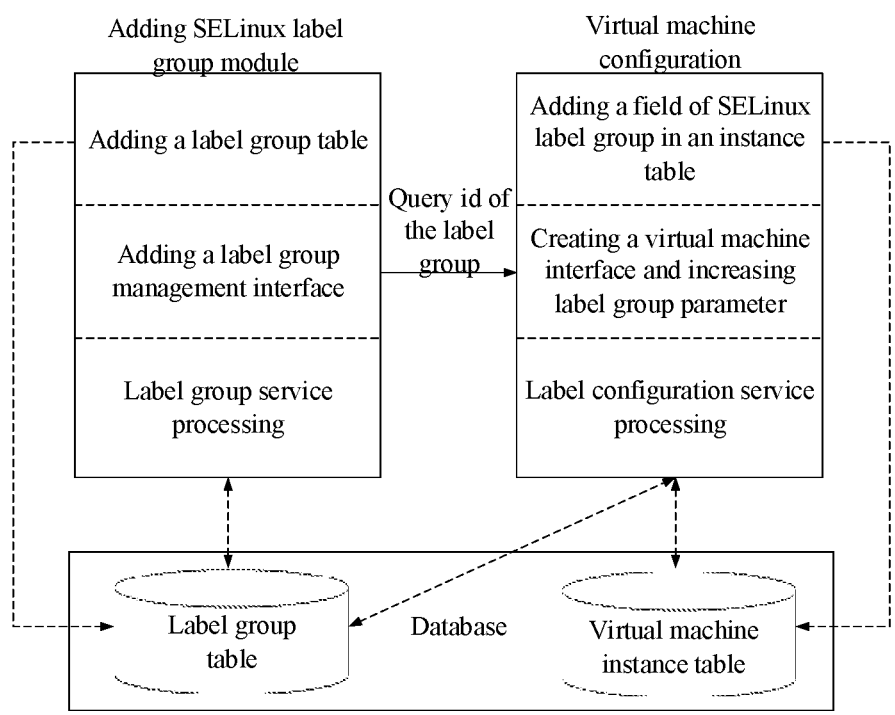
FIG. 6 is a schematic diagram illustrating a system for isolating virtual machines according to the present disclosure.

The system architecture for creating label groups and configuring virtual machines is shown in FIG. 6. In FIG. 6, the design realizes the generation-storage-allocation of the SELinux label groups, realizes the management of the SELinux label. Moreover, a switch option is set to enable or disable the function of the SELinux label groups in a flexible way. When a virtual machine instance is created, by specifying the ID of the SELinux label group, the assignment of the label group and the custom control of the SELinux label of the virtual machine are realized, the mandatory access control characteristic of SELinux is reasonably used, the precise isolation among the virtual machines is realized, and the security of the private cloud platform is improved.

As can be seen, the embodiment includes two modules, i.e., SELinux label group creation and virtual machine configuration. By adding the configuration parameter of the SELinux label group to the request parameter of the interface for creating virtual machines, the pointing allocation of the SELinux label group of the virtual machine is realized, so that the virtual machine is accurately isolated at the level of SELinux mandatory access control, and the security of the whole private cloud system is improved.

In order to introduce the solution provided by the present disclosure more clearly, the present disclosure is compared with CN104580505A and CN109101322A below.

1. The Comparison Between the Present Disclosure and CN104580505A

As stated above, the VLAN isolation means used in CN104580505A is directed to a network level, the granularity of isolation or communication is larger, and the security level needs to be improved.

However, in the process of creating virtual machines provided by the present disclosure, the virtual machines are configured with the same or different label groups to realize the isolation or intercommunication of different virtual machines. In the solution, it is not necessary to focus on whether the virtual machines needing to be isolated are deployed on the same physical machine or on different physical machines, and it only needs to configure different label groups for the virtual machines needing to be isolated, thereby achieving accurate isolation between the virtual machines, i.e., fine-grained management of virtual machines in the private cloud is achieved. The SELinux label may be used for isolating virtual machines at kernel level, that is to say, the isolation or communication among individual virtual machines is made such that the granularity of isolation or communication is finer. Since the present disclosure is based on an underlying isolation solution performed based on a virtual machine kernel, even if a certain virtual machine is hacked, since a SELinux label may guarantee the isolation of mandatory access control, it does not pose a threat to other virtual machines, and the security level is higher.

To sum up, the isolation means used in the present disclosure is directed to an underlying kernel of a virtual machine, and the granularity of isolation or communication is finer and the security level is higher.

2. The Comparison Between the Present Disclosure and CN109101322A

As stated above, in CN109101322A, the virtual machines are isolated based on "Sensitivity" in Selinux. The sensitivity-based isolation is not a complete isolation because sensitivities are used to control the sensitivity size of the label and there is an inclusion relationship. However, the present disclosure performs isolation or intercommunication on the basis of "Category" in Selinux, and the isolation realized on the basis of Category is complete isolation, because when the values assigned to Category are different, two labels do not have any relationship, and the Sensitivity sizes are the same, there is no inclusion relationship. It may be seen that label groups provided in the present disclosure have the same Sensitivity, and the design of the label groups is more reasonable, and complete isolation or intercommunication among different virtual machines may be achieved.

Further, CN109101322A takes a process, a mirror image, as a target to be labelled, and labels the process, the mirror image, at the start-up of a virtual machine, so that a process simultaneously holding an unpaired label does not access files and devices of the mirror image label. On the contrary, the present disclosure takes each virtual machine as a target to be labelled, and labels the virtual machine when the virtual machine is created to intercommunicate or isolate virtual machines. It may be seen that CN109101322A is different from the present disclosure in the target to be labelled, and there is no correlation between the implementation means and functions.

In addition, the present disclosure is controllable in two aspects:
 (1) the label groups are controllable, that is, management and control of label groups, such as adding, deleting and modifying the label group, are realized.
 (2) virtual machine isolation is controllable, that is, flexible control of isolation or intercommunication among different virtual machines is achieved, and multiple service scenarios may be adapted, for example, when a service requires resource sharing among a plurality of virtual machines while ensuring that these virtual machines remain isolated from other virtual machines, it is only necessary to ensure that the label groups of the these virtual machines are the same.

To sum up, the solution provided in the present disclosure is flexible and controllable, and may manage and control various label groups.

"First", "second", "third", "fourth" and the like as used in the present disclosure are used to distinguish similar objects, and are not necessarily used to describe a specific order or sequence. It should be understood that the data expressed in this manner is interchangeable under appropriate circumstances such that the embodiments described herein can be practiced in sequences other than those illustrated or described herein. Furthermore, the terms "comprising" and "having", as well as any variations thereof, are intended to cover a non-exclusive inclusion, e.g. a process, method or apparatus comprising a series of steps or elements is not necessarily limited to those steps or elements explicitly listed, but may include other steps or elements not explicitly listed or inherent to the process, method or apparatus.

It should be noted that the terms such as "first", "second" are for descriptive purposes only, and should not be understood as indicating or implying their relative importance or implicitly indicating the number of indicated technical features. Thus, the features defined as "first" and "second" may explicitly or implicitly include at least one of these features. In addition, the technical solutions of the various embodiments can be combined with each other, but it must be based on the realization of those skilled in the art. When the combination of technical solutions is contradictory or cannot be realized, it should be considered that the combination of technical solutions does not exist, nor within the scope of protection required by the present disclosure.

Various embodiments in the specification are described in a progressive manner, each embodiment focuses on the difference from other embodiments, and the same and similar parts of various embodiments can be referred to each other.

The steps of the methods or algorithms described in connection with the embodiments disclosed herein may be directly implemented by hardware, software modules executed by a processor, or a combination of both. Software modules can be placed in random access memory (RAM), internal memory, read-only memory (ROM), electrically programmable ROM, electrically erasable programmable ROM, registers, hard disk, removable disk, CD-ROM, or any other storage medium known in the technical field.

Herein, specific examples are used to illustrate the principles and implementation methods of the present disclosure. The descriptions of the above embodiments are only used to help understand the method and core idea of the application; meanwhile, for those skilled in the art, there will be changes in the specific implementation and scope of application based on the core idea of the application. In summary, the content of the specification should not be construed as limiting the present disclosure.

The invention claimed is:

1. A method for managing virtual machines, applied to a private cloud, comprising:
   acquiring a security-enhanced linux (SElinux) label, wherein the SElinux label comprises five elements of User, Role, Type, Sensitivity, and Category;
   setting elements other than the Category in the SElinux label as default values;
   obtaining a plurality of distinct label groups by assigning different values to variables in a preset Category variable combination, wherein the Category comprises a preset variable combination selected from a plurality of preset Category variable combinations within a first predefined range, and wherein each of the different values assigned to variables is within a second predefined range; and
   configuring each of the label groups for creating virtual machines in a private cloud, so that virtual machines configured with the same label group intercommunicate, and virtual machines configured with different label groups are isolated from each other;
   wherein the configuring each of the label groups for creating virtual machines in a private cloud comprises:
      extracting identification information about a label configuration switch and an ID of a to-be-configured label group from a request for creating a virtual machine, wherein the label configuration switch is used for indicating whether a SElinux label group is set for the virtual machine;
      determining that the to-be-configured label group is available based on the ID of to-be-configured label group being stored in a label group data table;
      configuring, based on the to-be-configured label group a basic parameter file used for creating a virtual machine and
      creating the virtual machine based on the basic parameter file, in response to determining based on the identification information that the label configuration switch is enabled and determining based on the ID that the to-be-configured label group is available.

2. The method for managing virtual machines according to claim 1, wherein a value range of a count of variables in the preset Category variable combination is [1, 1024]; an assignment range for each of the variables is [0, 1023], and the assignment for a latter variable in the preset Category variable combination is greater than the assignment for a former variable in the preset Category variable combination.

3. The method for managing virtual machines according to claim 2, wherein the obtaining a plurality of distinct label groups by assigning different values to variables in the preset Category variable combination comprises:
   obtaining the plurality of distinct label groups by assigning different values to the variables in the preset Category variable combination using an incremental strategy or a random strategy.

4. The method for managing virtual machines according to claim 1, further comprising:
   storing the plurality of distinct label groups.

5. The method for managing virtual machines according to claim 1, further comprising:
   returning a notification message indicating a virtual machine creation failure or jumping to a label group creation interface in response to determining based on the ID that the to-be configured label group is not available.

6. The method for managing virtual machines according to claim 5, wherein the determining based on the ID that the to-be-configured label group is not available comprises:
   determining, based on the ID, that the to-be-configured label group is not stored in the label group data table.

7. The method for managing virtual machines according to claim 1, further comprising:
   establishing a mapping relationship between the ID and a created virtual machine, and storing the mapping relationship to a mapping table.

8. The method for managing virtual machines according to claim 7, further comprising:
   querying, based on the ID, the mapping relationship as well as the label group and the virtual machine associated with the mapping relationship.

9. The method for managing virtual machines according to claim 7, further comprising:
   releasing and deleting the mapping relationship between a target virtual machine configured with a target label group and the target label group after deleting the target virtual machine.

10. The method for managing virtual machines according to claim 1, wherein the SElinux label is set for processes and files by SElinux, and is SElinux is a security subsystem of Mandatory Access Control (MAC) developed under an open source community of Linux.

11. The method for managing virtual machines according to claim 1, wherein in response to determining based on the identification information that the label configuration switch is disabled, a virtual machine is directly created based on the basic parameter file.

12. An electronic device, comprising:
a memory for storing a computer program; and
a processor for executing the computer program to implement operations of:
acquiring a security-enhanced linux (SElinux) label, wherein the SElinux label comprises five elements of User, Role, Type, Sensitivity and Category;
setting elements other than the Category in the SElinux label as default values;
obtaining a plurality of distinct label groups by assigning different values to variables in a preset Category variable combination, wherein the Category comprises a preset variable combination selected from a plurality of preset Category variable combinations within a first predefined range, and wherein each of the different values assigned to variables is within a second predefined range; and
configuring each of the label groups for creating virtual machines in a private cloud, so that virtual machines configured with the same label group intercommunicate, and virtual machines configured with different label groups are isolated from each other;
wherein the configuring each of the label groups for creating virtual machines in a private cloud comprises:
extracting identification information about a label configuration switch and an ID of a to-be-configured label group from a request for creating a virtual machine, wherein the label configuration switch is used for indicating whether a SElinux label group is set for the virtual machine;
determining that the to-be-configured label group is available based on the ID of to-be-configured label group being stored in a label group data table;
configuring, based on the to-be-configured label group a basic parameter file used for creating a virtual machine; and
creating the virtual machine based on the basic parameter file, in response to determining based on the identification information that the label configuration switch is enabled and determining based on the ID that the to-be-configured label group is available.

13. The electronic device according to claim 12, wherein a value range of a count of variables in the preset Category variable combination is [1, 1024]; an assignment range for each of the variables is [0, 1023], and the assignment for a latter variable in the preset Category variable combination is greater than the assignment for a former variable in the preset Category variable combination.

14. The electronic device according to claim 13, wherein the processor is further configured to implement operations of:
obtaining the plurality of distinct label groups by assigning different values to variables in the preset Category variable combination using an incremental strategy or a random strategy.

15. The electronic device according to claim 12, wherein the processor is further configured to implement operations of:
storing the plurality of distinct label groups.

16. The electronic device according to claim 12, wherein the processor is further configured to implement operations of:
returning a notification message indicating a virtual machine creation failure or jumping to a label group creation interface in response to determining based on the ID that the to-be-configured label group is not available.

17. The electronic device according to claim 12, wherein the processor is further configured to implement operations of:
establishing a mapping relationship between the ID and a created virtual machine, and
storing the mapping relationship to a mapping table.

18. The electronic device according to claim 17, wherein the processor is further configured to implement operations of:
querying, based on the ID, the mapping relationship as well as the label group and the virtual machine associated with the mapping relationship.

19. A non-transient computer-readable storage medium for saving a computer program, wherein the computer program, when executed by a processor, causes the processor to perform operations of:
acquiring a security-enhanced linux (SElinux) label, wherein the SElinux label comprises five elements of User, Role, Type, Sensitivity and Category;
setting elements other than the Category in the SElinux label as default values;
obtaining a plurality of distinct label groups by assigning different values to variables in a preset Category variable combination, wherein the Category comprises a preset variable combination selected from a plurality of preset Category variable combinations within a first predefined range, and wherein each of the different values assigned to variables is within a second predefined range;
configuring each of the label groups for creating virtual machines in a private cloud, so that virtual machines configured with the same label group intercommunicate, and virtual machines configured with different label groups are isolated from each other;
wherein the configuring each of the label groups for creating virtual machines in a private cloud comprises:
extracting identification information about a label configuration switch and an ID of a to-be-configured label group from a request for creating a virtual machine, wherein the label configuration switch is used for indicating whether a SElinux label group is set for the virtual machine;
determining that the to-be-configured label group is available based on the ID of to-be-configured label group being stored in a label group data table;
configuring, based on the to-be-configured label group, a basic parameter file used for creating a virtual machine; and
creating the virtual machine based on the basic parameter file, in response to determining based on the identification information that the label configuration switch is enabled and determining based on the ID that the to-be-configured label group is available.

* * * * *